United States Patent [19]
Yamaguchi et al.

[11] Patent Number: 5,469,780
[45] Date of Patent: Nov. 28, 1995

[54] APPARATUS FOR FILLING EDIBLE ROD-SHAPED HOLLOW BODIES WITH CHOCOLATE

[75] Inventors: Mitsuo Yamaguchi; Kenjiro Ohgo; Makoto Nagasawa, all of Sakado, Japan

[73] Assignee: Meiji Seika Kaisha, Ltd., Tokyo, Japan

[21] Appl. No.: 312,794

[22] Filed: Sep. 27, 1994

[30] Foreign Application Priority Data

Oct. 1, 1993 [JP] Japan ................................. 5-246745

[51] Int. Cl.⁶ .............................. A21C 9/00; A21C 9/06
[52] U.S. Cl. ........................................ 99/450.7; 99/450.1
[58] Field of Search ....................... 99/450.1–450.8, 99/494, 484, 485; 426/283–284, 94, 516, 281–282, 306; 425/462, 133.1, 297, 308, 311, 126.2, 113, 241, 130, 131.1

[56] References Cited

U.S. PATENT DOCUMENTS

| | | | |
|---|---|---|---|
| 3,602,155 | 8/1971 | Mendoza | 425/241 |
| 3,615,675 | 10/1971 | Wisdom et al. | 426/281 |
| 3,669,005 | 6/1972 | Fullerton | 99/450.1 |
| 3,906,850 | 9/1975 | Papal | 99/450.7 |
| 4,511,318 | 4/1985 | Kolodesh et al. | 425/133.1 |
| 4,580,489 | 4/1986 | Haas, Sr. et al. | 99/450.7 |
| 4,664,027 | 5/1987 | Pauron | 99/450.7 |
| 4,698,000 | 10/1987 | Thulin et al. | 425/133.1 |
| 4,715,803 | 12/1987 | Koppa | 425/462 |
| 4,752,488 | 6/1988 | Hayashi et al. | 426/94 |
| 4,882,185 | 11/1989 | Simelunas, et al. | 425/311 |
| 5,209,156 | 5/1993 | Lombard | 99/450.7 |

*Primary Examiner*—Timothy F. Simone
*Attorney, Agent, or Firm*—Nikaido, Marmelstein, Murray & Oram

[57] ABSTRACT

Disclosed is an apparatus for filling edible, rod-shaped hollow bodies with chocolate comprising a feeding unit (1) for conveying hollow bodies (A), a transport roller (2) positioned close to the feeding unit, a first transfer roller (5) positioned close to the transport roller, a chocolate filling roller (8) positioned close to the first transport roller, a second transfer roller (13) positioned close to the chocolate filling roller, and a discharging unit (14) positioned close to the second transfer roller for receiving and conveying hollow bodies filled with chocolate from the chocolate filling roller via the second transfer roller. The apparatus assures the continuous flow of hollow bodies to the chocolate filling station without any fear of breaking fragile hollow bodies, thereby permitting mass production of chocolate corn cakes, each filled with an exact amount of chocolate.

6 Claims, 3 Drawing Sheets

APPARATUS FOR FILLING EDIBLE ROD-SHAPED HOLLOW BODIES WITH CHOCOLATE

BACKGROUND OF THE INVENTION

1. Field of the Invention

The present invention relates to an apparatus for filling edible, rod-shaped hollow bodies with chocolate. Such edible, rod-shaped hollow bodies are prepared by baking or heating and expanding grain.

2. Description of Related Art

An apparatus for making cream cakes or cream puffs functions to fill hollow pieces of light pastry with cream or jam one after another, as disclosed in Japanese Patent 56-64753(A) (Cream Filler). It uses a conveyer equipped with a cream filler, which conveyer can be changed for making a different kind of cream cake or cream puff.

Also, an apparatus for inserting rods into edible rod-shaped bodies, such as sausages is disclosed in Japanese Utility Model 5-14795(Y) (Rod-Inserting Apparatus).

The cream filler has parts intermittently moving laterally and longitudinally, and disadvantageously it requires a relatively large floor space to occupy, and still disadvantageously, synchronization of the lateral and longitudinal intermittent moves in the cream filler is difficult to be attained.

The rod-inserting apparatus cannot be applied to the filling of edible, rod-shaped hollow bodies with chocolate.

SUMMARY OF THE INVENTION

One object of the present invention is to provide an apparatus for filling edible, rod-shaped hollow bodies with chocolate, not requiring a large floor space to occupy, permitting the mass production of chocolate-filled cakes with no fear of breaking fragile edible enclosures, and assuring that edible enclosures are filled with exact amount of chocolate.

To attain this object an apparatus for filling edible, rod-shaped hollow bodies with chocolate according to the present invention comprises: a feeding unit for conveying the edible, rod-shaped hollow bodies; a transport roller positioned close to the feeding unit; a first transfer roller positioned close to the transport roller; a chocolate filling roller positioned close to the first transport roller; a second transfer roller positioned close to the chocolate filling roller; and a discharging unit positioned close to the second transfer roller for receiving and conveying edible, rod-shaped hollow bodies filled with chocolate from the chocolate filling roller via the second transfer roller, each of the transport roller, first transfer roller, chocolate filling roller and second transfer roller having same recesses made at same regular intervals on its circumference for receiving the edible, rod-shaped hollow bodies, and being adapted to rotate at one and same circumference speed.

Edible, rod-shaped hollow bodies (hereinafter referred to simply as "hollow bodies") are rolled wafers, rolled biscuits, coarse-pulverized and extruded corn and the like.

A first guide means extends along a predetermined circumferential length of the transport roller upstream of the first contact point at which the transport roller and the first transfer roller meets, and a second guide means extends from the first contact point to the second contact point at which the first transfer roller and the chocolate filling roller meets, along the lower, semicircular circumference of the first transfer roller, thereby permitting hollow bodies to transfer from the transport roller to the chocolate filling roller via the first transfer roller.

The chocolate filling roller comprises first, second and third sub-rollers rotating about one and same axle. The first sub-roller is positioned close to the first and second transfer rollers, and the first sub-roller has same recesses made at same regular intervals as the first transfer roller, and is adapted to rotate at same circumference speed as the first transfer roller, thereby receiving and bearing hollow bodies from the first transfer roller. It may be called "hollow body carrying roller". The second sub-roller has same recesses made at same regular intervals as the first sub-roller or "hollow body carrying roller", and is adapted to rotate and bring hollow bodies to chocolate-filling positions at which selected hollow bodies are put in alignment with a plurality of chocolate extruding nozzles. It may be called "hollow body positioning roller". Finally, the third sub-roller has, in addition to the chocolate extruding nozzles, a corresponding plurality of piston-cylinder pumps each allotted to each of said chocolate extruding nozzles, and a chocolate vessel for supplying each of the piston-cylinder pumps with chocolate, thus permitting the chocolate extruding nozzles to eject a given amount of chocolate to each of the hollow bodies when brought to chocolate-filling positions.

A third guide means is consecutive to the second guide means, extending from the second contact point at which the first sub-roller and the first transfer roller meets to the downstream point of the circumference of the first sub-roller at which downstream point there is no fear of permitting hollow bodies to fall off under gravity. These first, second and third guide means work together for transferring hollow bodies from the transporting roller to the second sub-roller or "hollow body positioning" roller, thereby bringing the fragile hollow bodies to the chocolate filling position without any fear of breaking, thus permitting the mass production of chocolate-filled corn cakes.

A fourth guide means relays hollow bodies, and directing those filled with chocolate to the second transfer roller.

The fourth guide means includes a feeding guide means climbing and extending obliquely from the terminal point of the third guide means to the point at which recesses of the circumference of the second sub-roller appear sequentially, and a withdrawing guide means extending from the chocolate-ejection starting point to the chocolate-ejection ending point on the circumference of the second sub-roller, and extending obliquely toward the circumference of the first sub-roller. The third sub-roller further has a plurality of three-way valves each associated with each of the piston-cylinder pumps to communicate with the chocolate vessel. Each of the piston-cylinder pumps has a guide roll fixed to its piston, and the piston-cylinder pumps are adapted to be operated by permitting their guide rolls to travel along a stationary curved roll-pinch guide encircling the third sub-roller.

The third sub-roller has upstream and downstream detectors for detecting arrival of hollow bodies at the chocolate-ejection starting point and the chocolate-ejection ending point, thereby opening and closing selected valves.

Other objects and advantages of the present invention will be understood from the following description of an apparatus for filling hollow bodies with chocolate according to a preferred embodiment of the present invention, which is shown in accompanying drawings.

DESCRIPTION OF THE PREFERRED EMBODIMENTS

Figure 1:
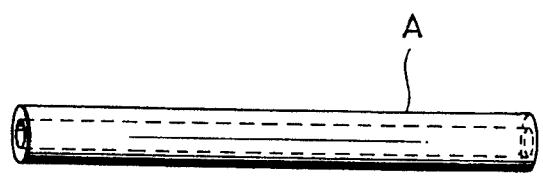
FIG. 1 is a side view of an edible, rod-shaped hollow body.

FIG. 1 shows an edible, rod-shaped hollow body "A" which is to be filled with chocolate.

Figure 2:
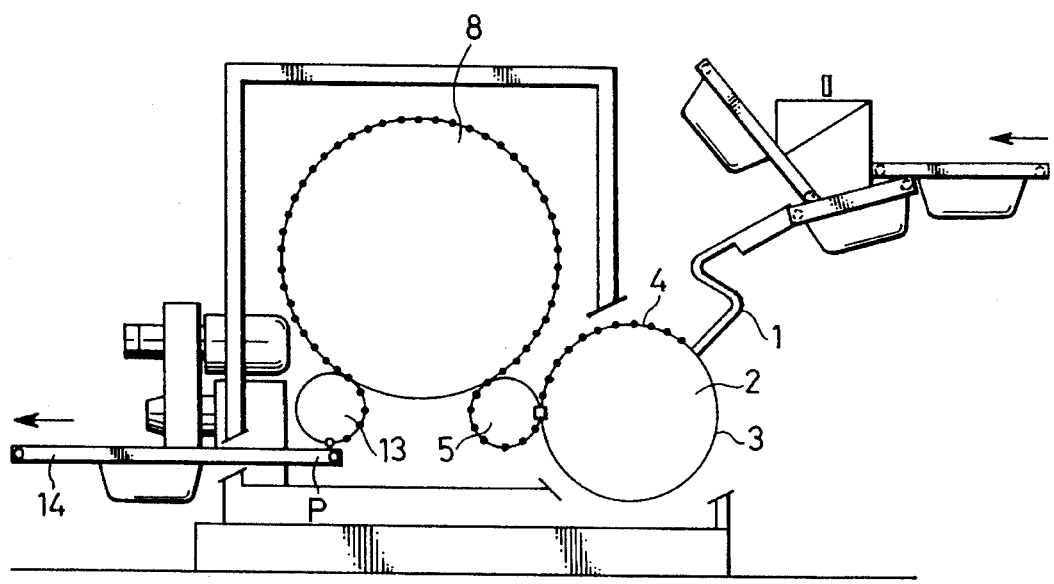
FIG. 2 is a front view of the apparatus for filling edible, rod-shaped hollow bodies with chocolate.

Referring to FIG. 2, an apparatus for filling hollow bodies with chocolate comprises a feeding unit 1 for conveying hollow bodies "A", a transport roller 2 positioned close to the feeding unit 1, a first transfer roller 5 positioned close to the transport roller 2, a chocolate filling roller 8 positioned close to the first transport roller 5, a second transfer roller 13 positioned close to the chocolate filling roller 8, and finally a discharging unit 14 positioned close to the second transfer roller 13 for receiving and conveying hollow bodies "A" filled with chocolate from the chocolate Filling roller 8 via the second transfer roller 13. The transport roller 2 has recesses made at regular intervals on its circumference for receiving hollow bodies, and is adapted to rotate at a predetermined circumference speed.

The transfer roller 5 has the same recesses made at same intervals as the transport roller 2, and is adapted to rotate at the same circumference speed as the transport roller 2. Likewise, the chocolate Filling roller 8 has the same recesses made at the same intervals, and is adapted to rotate at the same circumference speed as the transport roller 2 and the first transfer roller 5. This is the same with the second transfer roller 13.

Hollow bodies are laid perpendicular to the direction in which they are travelling on the feeding unit 1 at a predetermined speed, the end of which is put close to the circumference 3 of the transport roller 2 so that hollow bodies may fall on the transport roller 2 under gravity. Thus, hollow bodies are received one after another in the recesses 4 of the transport roller 2.

At the contact point at which the transport roller 2 and the first transfer roller 5 meet these rollers 2 and 5 are so positioned that their recesses may face each other all the time, thereby permitting hollow bodies to transfer from the transport roller 2 to the first transfer roller 5 without any fear of breaking (this recess-to-recess facing arrangement being assured between the first transfer roller 5 and the chocolate filling roller 8, and between the chocolate filling roller 8 and the second transfer roller 13).

To permit a hollow body "A" to transfer without being broken it is necessary to float the hollow body "A" from the bottom of the recess 4. For the purpose of floating somewhat hollow bodies "A" one after another on the way to the first transfer roller 5 a first guide means is provided in the form of support guide plates 6 placed on the opposite sides of the transport roller 2, extending a predetermined circumferential length of the transport roller 2 upstream of the first contact point at which the transport roller 2 and the first transfer roller 5 meets.

Figure 3:
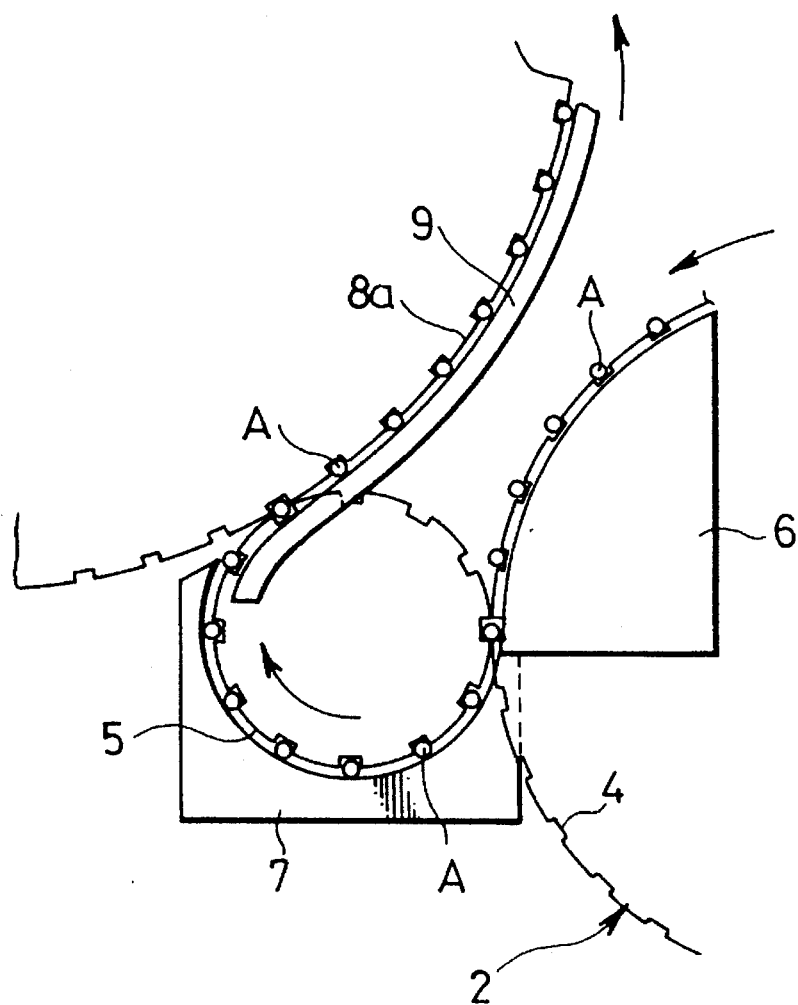
FIG. 3 is an enlarged front view of the first and second guide means associated with the transport roller, the first transfer roller and the chocolate filling roller.
Figure 4:
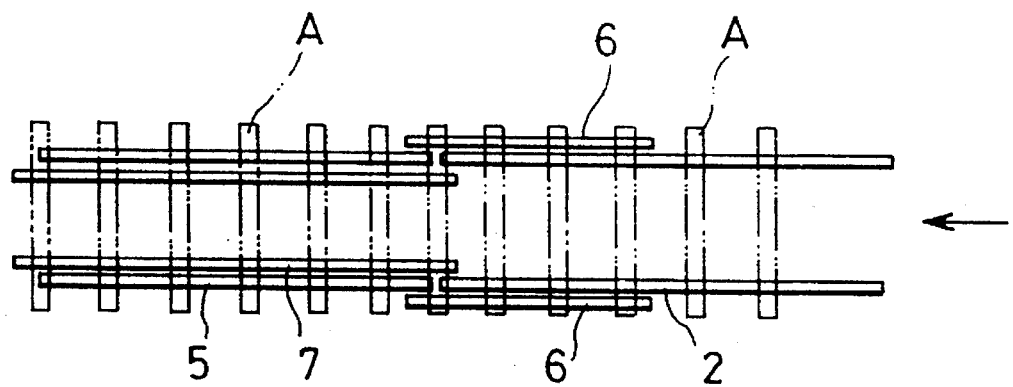
FIG. 4 is an enlarged bottom view of the first and second guide means.

Next, to prevent hollow bodies "A" from falling off from the first transfer roller 5 under gravity a second guide means is provided in the form of concave stand 7. Its concave surface extends from the first contact point to the second contact point at which the first transfer roller 5 and the first sub-roller 8a of the chocolate filling roller 8 meets, running along the lower, semicircular circumference of the first transfer roller 5, as best seen from FIG. 3. The second guide means 7 may be in the form of parallel rods arranged at an interval somewhat shorter than the length of hollow bodies "A", as best seen from FIG. 4. With this arrangement hollow bodies "A" are permitted to transfer from the transport roller 2 to the first sub-roller 8a of the chocolate filling roller 8 via the first transfer roller 5.

Again referring to FIG. 3, a third guide means 9 is consecutive to the second guide means 7, and is formed in the form of curved parallel rods, which are arranged at the opposite sides of the first sub-roller 8a, extending from the second contact point at which the first sub-roller 8a and the first transfer roller 5 meets to the downstream point of the circumference of the first sub-roller 8a at which downstream point there is no fear of allowing hollow bodies to fall off under gravity.

A second sub-roller 8b is arranged adjacent to the first sub-roller 8a, and it has the same recesses at the same intervals as the first sub-roller 8a, and these sub-rollers 8a and 8a are arranged side by side with their recesses aligned with each other, and have one and same axle. A fourth guide means relays hollow bodies, and directing those filled with chocolate to the second transfer roller 13. As seen from FIG. 5, the fourth guide means includes a feeding guide means 9a climbing and extending obliquely from the terminal point of the third guide means 9 to traverse obliquely the first sub-roller 8a, thus leading hollow bodies "A" to the second sub-roller 8b.

Figure 5:
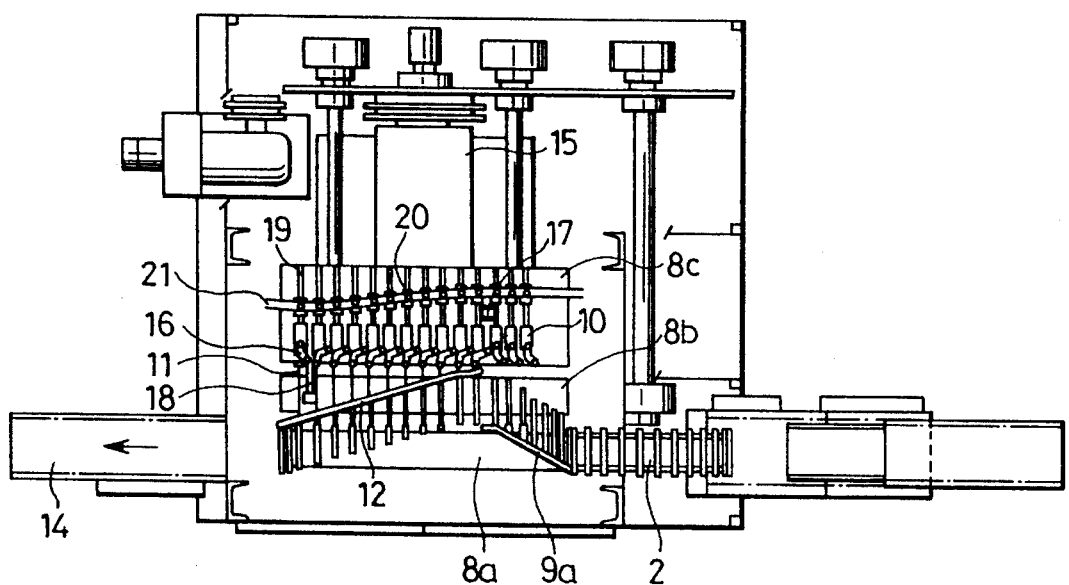
FIG. 5 is a plane view of the chocolate filling apparatus.

Also, as seen from FIG. 5, the third sub-roller 8c has a plurality of piston-cylinder pumps 10 each integrally combined with a chocolate-ejecting nozzle 11. The chocolate-ejecting nozzles 11 are arranged in alignment with recesses of the second sub-roller 8b. At the time of transferring hollow bodies one after another to selected recesses of the second sub-roller 8b the chocolate-ejecting nozzles 11 are inserted sequentially in all hollow bodies "A" thus transferred to the second sub-roller 8b. Then, each chocolate-ejecting nozzle 11 has its end reaching a predetermined depth in the hollow body when it has reached the terminal end of the feeding guide means 9a, and then, the piston-cylinder pump 10 starts injection of chocolate in the hollow body "A".

Immediately after injection of chocolate the hollow body "A" starts the transferring from the second sub-roller 8b to the first sub-roller 8a, continuing the transferring to the first sub-roller 8a while the hollow body "A" is being filled with chocolate. The piston-cylinder pump 10 stops injection of chocolate when the hollow body "A" is filled with a given amount of chocolate.

A withdrawing guide means 12 traverses obliquely the second sub-roller 8b to lead hollow bodies "A" while being filled with chocolate, so that hollow bodies filled with chocolate ride on the first sub-roller 8a.

Another guide means (not shown) which is consecutive to the withdrawing guide means 12 relays chocolate-filled hollow bodies until they reach the contact point between the first sub-roller 8a and the second transfer roller 13. This guide means may take the same shape as the third guide means 9 (FIG. 3), and may be placed symmetrically with the third guide means 9 with respect to the vertical plane including the axle of the chocolate filling roller 8.

Still another guide means (not shown) is provided to the second transfer roller 13 to prevent chocolate-filled hollow bodies from falling off from the second transfer roller 13. It has the same shape as the second guide means 7 (FIG. 3), extending to the point P at which chocolate-filled hollow bodies fall on the underlying discharging conveyer 14.

The third sub-roller 8c rotates about the same axle as the first sub-roller 8a, thus rotating together. The third sub-roller 8c has a chocolate vessel 15 integrally connected thereto, thus rotating along with the chocolate vessel 15. The chocolate vessel 15 and the piston-cylinder pumps 10 are filled with chocolate, leaving no air space therein.

A stationary detector 17 detects arrival of a sequential hollow body for operating the switching lever 16 associated with the piston-cylinder pump 10 just in front of the hollow body arriving there, thereby stopping the flow of chocolate into the cylinder of the piston-cylinder pump 10 via an associated three-way valve (not shown). Then, the piston-cylinder pump 10 starts moving its piston 19 to inject a given amount of chocolate in the hollow body while travelling downstream. When the hollow body reaches another stationary detector, the switching lever 16 turns the associated three-way valve 16 to switch the flow of chocolate to the cylinder of the piston-cylinder pump 10 from the chocolate vessel 15, thereby stopping injection of chocolate in the hollow body.

Each of the piston-cylinder pumps 10 has a guide roll 20 fixed to its piston 19, and the piston-cylinder pumps 10 are operated by permitting their guide rolls 20 to travel along a stationary curved roll-pinch guide 21 encircling the third sub-roller 8c. The stroke of the piston 19 in the cylinder, and hence, the amount of chocolate to be injected depends on the degree of curvature of the stationary curved roll-pinch guide 21.

While selected piston-cylinder pumps 10 travel under the chocolate filling roller 8, their cylinders are being filled with chocolate, which flows from the chocolate vessel 15. Piston-cylinder pumps 10 arrive at the stationary detector 17 one after another, and then the flow of chocolate to the piston-cylinder pump 10 is made to stop by switching the flow of chocolate to the hollow body through the three-way valve, which is operated by the switching lever 16. Then, the piston 19 is pushed to inject chocolate into the hollow body "A" through the nozzle 11, and injection of chocolate into the hollow body "A" continues until the hollow body "A" reaches the downstream detector 18, where the switching lever 16 is actuated to switch the flow of chocolate to the cylinder of the piston-cylinder pump 10 through the three-way valve, thus stopping injection of chocolate into the hollow body "A".

After passing through the downstream detector the piston-cylinder pump 10 starts the withdrawing of the piston 19 through the action of the pinch roll 20 travelling the stationary curved roll-pinch guide 21, thereby drawing chocolate into the cylinder via the three-way valve, which is switched for the cylinder of the piston-cylinder pump 10.

As seen from FIG. 5, the stationary curved roll-pinch guide 21 encircles the third sub-roller 8c, and each piston-cylinder pump 10 draws chocolate into its cylinder while travelling from the downstream detector to the upstream detector 17, and it injects chocolate to the hollow body "A" while travelling from the upstream detector 17 to the downstream detector.

The cylinder of each piston-cylinder pump 10 communicates with the chocolate vessel 15 by a channel (not shown), which is made in the third sub-roller 8c, ending with the three-way valve. The intervening three-way valve is responsive to the withdrawing action of the piston 19 for opening, and responsive to the advancing of the piston for closing, thereby preventing the backflow of chocolate to the third sub-roller 8c, and permitting the injection of chocolate into the hollow body "A" through the nozzle 11.

As may be understood from the above, an apparatus for filling edible, rod-shaped hollow bodies with chocolate according to the present invention assures the continuous flow of hollow bodies to the chocolate filling station without any fear of breaking fragile hollow bodies, thereby permitting mass production of chocolate corn cakes, each filled with an exact amount of chocolate. Also, advantageously the chocolate filling apparatus requires no large floor space to occupy.

We claim:

1. An apparatus for filling edible, rod-shaped hollow bodies with chocolate comprising:

a feeding unit (1) for conveying said edible, rod-shaped hollow bodies (A); a transport roller (2) positioned close to said feeding unit: a first transfer roller (5) positioned close to said transport roller; a chocolate filling roller (8) positioned close to said first transport roller; a second transfer roller (13) positioned close to said chocolate filling roller; and a discharging unit (14) positioned close to said second transfer roller for receiving and conveying edible, rod-shaped hollow bodies filled with chocolate from said chocolate filling roller via said second transfer roller, each of said transport roller, first transfer roller, chocolate filling roller and second transfer roller having same recesses (4) made at same regular intervals on its circumference for receiving said edible, rod-shaped hollow bodies, and being adapted to rotate at one and same circumference speed.

2. An apparatus for filling edible, rod-shaped hollow bodies with chocolate according to claim 1, wherein it further comprises: a first guide means (6) extending along a predetermined circumferential length of said transport roller (2) upstream of the first contact point at which said transport roller and said first transfer roller (5) meets; and a second guide means (7) extending from the first contact point to the second contact point at which said first transfer roller and said chocolate filling roller (8) meets, along the lower, semicircular circumference of said first transfer roller, thereby permitting said edible, rod-shaped hollow bodies (A) to transfer from said transport roller to said chocolate filling roller via said first transfer roller.

3. An apparatus for filling edible, rod-shaped hollow bodies with chocolate according to claim 2, wherein said chocolate filling roller (8) comprises first, second and third sub-rollers (8a), (8b) and (8c) rotating about one and same axle, said sub-rollers being positioned close to said first and second transfer rollers (5) and (13), said first sub-roller having same recesses (4) made at same regular intervals as said first transfer roller, and being adapted to rotate at same circumference speed as said first transfer roller, thereby receiving and bearing edible, rod-shaped hollow bodies (A) from said first transfer roller; said second sub-roller having same recesses made at same regular intervals as said first sub-roller, and being adapted to rotate and bring edible, rod-shaped hollow bodies to chocolate-filling positions at which selected edible, rod-shaped hollow bodies are put in alignment with a plurality of chocolate extruding nozzles (11); and said third sub-roller having, in addition to said chocolate extruding nozzles, a corresponding plurality of piston-cylinder pumps (10) each allotted to each of said chocolate extruding nozzles, and a chocolate vessel (15) for supplying each of said piston-cylinder pumps with chocolate, thus permitting said chocolate extruding nozzles to eject a given amount of chocolate to each of said edible, rod-shaped hollow bodies when brought to chocolate-filling positions.

4. An apparatus for filling edible, rod-shaped hollow bodies with chocolate according to claim 3, wherein it further comprises: a third guide means (9) consecutive to the second guide means (7), extending from the second contact point at which said first sub-roller (8a) and said first transfer roller (5) meets to the downstream point of the circumference of said first sub-roller at which downstream point there is no fear of permitting edible, rod-shaped hollow bodies (A) to fall off; and a fourth guide means relaying edible, rod-shaped hollow bodies, and directing those filled with chocolate to said second transfer roller (13).

5. An apparatus for filling edible, rod-shaped hollow bodies with chocolate according to claim 4, wherein said fourth guide means includes: a feeding guide means (9a) climbing and extending obliquely from the terminal point of the third guide means (9) to the point at which recesses of the circumference of the second sub-roller (8b) appear sequentially; and a withdrawing guide means (12) extending from the chocolate-ejection starting point (17) to the chocolate-ejection ending point (18) on the circumference of the second sub-roller, and extending obliquely toward the circumference of the first sub-roller (8a); said third sub-roller (8c) further having a plurality of three-way valves each associated with each of said piston-cylinder pumps (10) to communicate with said chocolate vessel (15); each of said piston-cylinder pumps has a guide roll (20) fixed to its piston (19), and said piston-cylinder pumps are adapted to be operated by permitting their guide rolls to travel along a stationary curved roll-pinch guide (21) encircling the third sub-roller.

6. An apparatus for filling edible, rod-shaped hollow bodies with chocolate according to claim 5, wherein said third sub-roller (8c) has upstream and downstream detectors (17) and (18) for detecting arrival of edible, rod-shaped hollow bodies (A) at the chocolate-ejection starting point and the chocolate-ejection ending point, thereby opening and closing selected valves.

* * * * *